United States Patent [19]
Ligh et al.

[11] Patent Number: 5,975,130
[45] Date of Patent: Nov. 2, 1999

[54] CHECK VALVE WITH A LOW INERTIA MOVING PART FOR LOW OR HIGH PRESSURE DIFFERENTIALS

[75] Inventors: J. Yen Ligh; Juan A. Giscard, both of Houston, Tex.

[73] Assignee: Valve Concepts, Inc., Houston, Tex.

[21] Appl. No.: 08/833,539

[22] Filed: Apr. 7, 1997

[51] Int. Cl.⁶ .................................................. F16K 15/00
[52] U.S. Cl. ........................................ 137/519.5; 137/519
[58] Field of Search ................................. 137/519.5, 519

[56] References Cited

U.S. PATENT DOCUMENTS

| | | | |
|---|---|---|---|
| 2,316,495 | 4/1943 | White | 137/519.5 |
| 2,328,014 | 8/1943 | Heigis | 137/519.5 |
| 3,113,587 | 12/1963 | Hendley | 137/519.5 |
| 3,466,819 | 9/1969 | Giger | 137/519.5 |
| 3,534,768 | 10/1970 | Powell | 137/496 |
| 3,776,258 | 12/1973 | Dockins, Jr. | 137/519.5 |
| 3,861,415 | 1/1975 | Larsen | 137/519.5 |
| 4,155,374 | 5/1979 | Diehl | 137/519.5 |
| 4,756,335 | 7/1988 | Kim | 137/519.5 |
| 5,086,613 | 2/1992 | Fox et al. | 137/519.5 |

OTHER PUBLICATIONS

"CP" Series One–Piece, Pipe Ended Check Valves Nupro Company Brochure Mar. 1994.

"50" Series Lift Check Valves Nupro Company, Mar. 1994 Brochure.

*Primary Examiner*—Denise L. Ferensic
*Assistant Examiner*—Joanne Y. Kim
*Attorney, Agent, or Firm*—Kenneth H. Johnson

[57] ABSTRACT

A check valve having an elongated body with bore therethrough, the bore having a small diameter section abutting a downstream frustoconical section with an increasing diameter, a ball positioned downstream of the small diameter section and movable in the frustoconical section and a pin blocking the bore to keep the ball at or near the frustoconical section and near to the small section, such that a reversal in fluid flow will seat the ball within the frustoconical section and block the bore.

8 Claims, 1 Drawing Sheet

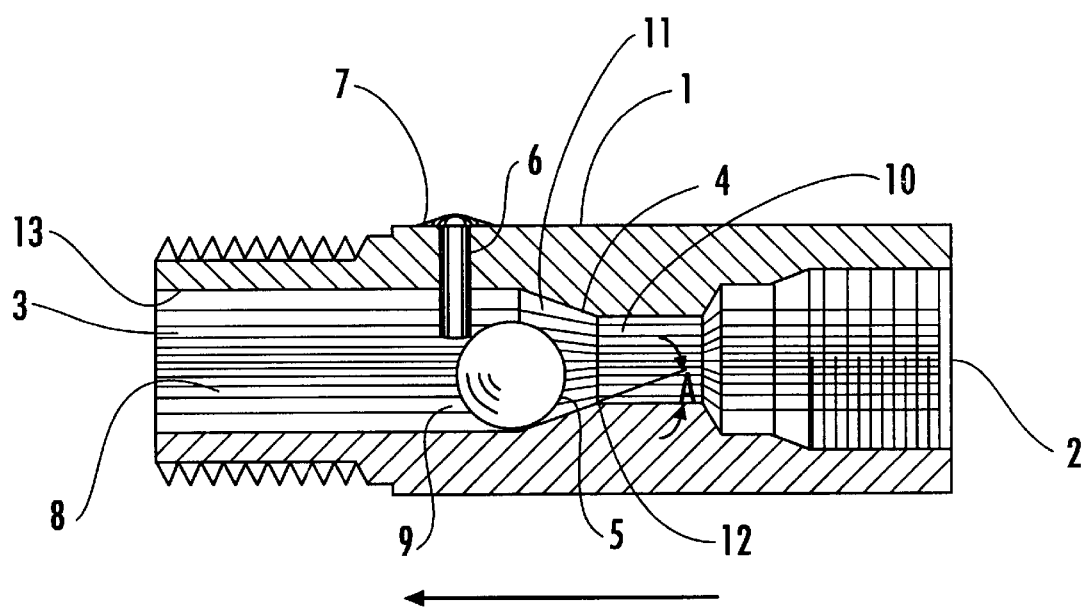

CHECK VALVE WITH A LOW INERTIA MOVING PART FOR LOW OR HIGH PRESSURE DIFFERENTIALS

BACKGROUND OF THE INVENTION

1. Field of the Invention

The present invention relates to an improved check valve suitable for general purpose use or for use on instrument lines or valve operating accessories where the pressures encountered are very low (inches of water column) to very high (several thousand psi).

2. Related Art

Currently known check valves for low differential pressure application (low cracking pressure) are either not reliable after a few cycles of operation or the cracking pressure is too high for operating in the inches of water column pressure range.

Common check valves utilize a light force spring and a soft elastomeric seal to close the valve against backflow. Another method is to utilize a ball or piston as the moving/sealing member, with or without the aid of a spring.

Another method of construction is to use a member that is hinged on one edge (usually the top edge) which allows the member to swing closed or open depending on the pressure conditions in the valve. This type of construction is usually reserved for larger size valves.

A disadvantage of common check valves is that the elastomeric sealing material must be carefully selected for chemical compatibility with the service medium.

The Anderson-Greenwood diaphragm-type check valve (U.S. Pat. No. 3,534,768) was designed to overcome the relatively high inertia required to open instrument check valves available at that time. The design is plausible but after just a few cycles of operation, the teflon diaphragm takes a "set" (or loss of "memory") which renders the check valve incapable of stopping flow or leakage when the pressure condition is reversed.

It is an advantage of the present check valve that it is capable of withstanding high system pressure while allowing the seat to "crack" open or seal with just an inch or two of water column pressure. It is a simple three-piece design readily made from materials of construction that are compatible with most chemicals.

SUMMARY OF THE INVENTION

Briefly the present invention is a check valve comprising an elongated body, a bore extending through said body along the long axis thereof, a ball positioned in said bore and having a first diameter, an upstream section of said bore having a second diameter which is smaller than first diameter, a downstream section of said bore, contiguous to said upstream section, said downstream section defining a frustoconical form and having a diameter at least as great as said second diameter and increasing distal to said upstream section to a third diameter greater than said first diameter and said second diameter, a pin extending into said bore at a point in said bore having a greater diameter than said first diameter a sufficient distance to prevent said ball from moving past said pin, said ball being positioned between said pin and said upstream section and moveable in said downstream section.

BRIEF DESCRIPTION OF THE DRAWING

The drawing is an elevational cross section along the axis of flow of the present check valve.

DETAILED DESCRIPTION OF THE INVENTION

Referring to the FIGURE, the components of the check valve are: body 1, inlet port 2, outlet port 3, a conical surface within the body 4, a ball 5 and pin 6, seal welded 7 to the body. The body 1 is an elongated member having a bore 8 extending therethrough to provide a path for fluid flow. The bore has a circular cross section, at least at those sections in the essential to the functioning of the valve. The direction of flow is indicated by the arrow. Section 10 of the bore has a first diameter smaller than the diameter of ball 5. Section 11 joins section 10 at annular joint 12. The diameter of section 11 increases from that of section 10 to a diameter greater than the diameter of said ball and defines a frustoconical form.

In the FIGURE the valve is open and fluid is able to pass around the ball where it is not in contact with the internal wall 13 of the bore. In this embodiment section 9 has a diameter which is greater than the diameter of said ball and is the same diameter as the largest diameter of section 11. The pin 6 extends into the bore to provide a stop which prevents the ball from leaving the bore and keeps the ball at or near the frustoconical section and juxtaposed to the upstream section. The diameter of sections 9 and 11 should be sized to allow adequate space for fluid flow when the ball is downstream in the open position. When the fluid flow reverses from that of the arrow the ball 5 moves along section 11 seating at a point within section 11 prior to joint 12 and blocking the bore 9. The exact point of seating will vary with angle A.

The body wall thickness may be adjusted for high pressure ratings. Inlet/outlet connections may be threaded (male or female) or flanged, or any combination to suit a particular installation. The angle "A" for the frustoconical bore should be small enough so that a slight pressure reversal will move the ball to seat and prevent backflow. The angle, on the other hand, should not be so small that the ball will wedge in the closed position under a high backflow pressure. The angle A of the frustoconical section 11 may be in the range of 15 to 30°. A preferred angle is approximately 20 degrees. The pin (6) is located such that the distance the ball has to travel to seat is minimal, yet it allows the ball to move away from the seat sufficient to achieve good flow through the valve. To further reduce the inertia required to move the ball to the seating position when a pressure reversal is encountered, the check valve may be installed at an angle equal to the angle of the conical bore with the inlet port lower than the outlet port. In this position one surface of the conical bore is horizontal, which allows the ball to roll easily with the slightest change in pressure differential in either direction. The body material may be plastic or metallic, or whatever is required for chemical compatibility. The ball may be an elastomer, steel, plastic, ceramic, or other suitable material.

A body made in stainless steel with a ceramic ball should be compatible with most of the common chemicals. This material combination also allows operation with either very low or very high pressures. During assembly the ball may be seated against the conical surface by striking the ball. A suitable ceramic useful in general applications, other than hydrochloric or hydrofluoric acids and strong alkaline solutions, is alumina oxide having the following properties: a density of 3.86 $gm/cm^3$, hardness of 1365 Vickers, useful maximum temperature of 3180° F. and compressive strength of 330,000 psi. This ceramic is not affected by the blow, but a seat is formed in the stainless steel. Silicon carbide, ruby sapphire and silicon nitride ball would be suitable more expensive alternatives but are substantially inert to most substances.

The invention claimed is:

1. A check valve comprising an elongated body, a bore extending through said body along the long axis thereof, a ball positioned in said bore and having a first diameter, an upstream section of said bore having a second diameter which is smaller than first diameter, a downstream section of said bore, contiguous to said upstream section, said downstream section defining a frustoconical form having an angle of between 15° and 20° and having a diameter at least as great as said second diameter and increasing distal to said upstream section to a third diameter, greater than said first diameter and said second diameter, a pin extending into said bore at a point downstream having a greater diameter than said first diameter and extending a distance into said bore at a point having a diameter greater than said first diameter to prevent said ball from moving past said pin and allow a gas flow past said ball, said ball being positioned between said pin and said upstream section and moveable in said downstream section.

2. The check valve according to claim 1 wherein a ball seat is formed within said frustoconical.

3. A check valve comprising an elongated body, a bore extending through said body along the long axis thereof, a ball positioned in said bore and having a first diameter, an upstream section of said bore having a second diameter which is smaller than first diameter, a downstream section of said bore, contiguous to said upstream section, said downstream section defining a frustoconical form having an angle of about 20° and having a diameter at least as great as said second diameter and increasing distal to said upstream section to a third diameter, greater than said first diameter and said second diameter, a pin extending into said bore at a point downstream having a greater diameter than said first diameter and extending a distance into said bore at a point having a diameter greater than said first diameter to prevent said ball from moving past said pin and allow a gas flow past said ball, said ball being positioned between said pin and said upstream section and moveable in said downstream section.

4. The check valve according to claim 3 wherein a ball seat is formed within said frustoconical.

5. A check valve comprising;
   (a) an elongated body, a bore extending through said body along the long axis thereof and having three contiguous sections,
      (1) an upstream section of said bore having a first diameter,
      (2) a downstream section which has a second diameter larger than said first diameter, and
      (3) a section of increasing diameter between said first and second sections of said bore;
   (b) said section of increasing diameter defining a frustoconical form having an angle of between 15° and 20°;
   (c) a ball positioned in said downstream section having a third diameter larger than said first diameter and smaller than said second diameter; and
   (d) a pin extending into said bore in said downstream section at a point downstream of said ball and extending a distance into said bore to prevent said ball from moving past said pin, said ball being positioned between said pin and said upstream section and moveable in said downstream section.

6. The check valve according to claim 5 wherein a ball seat is formed within said frustoconical.

7. A check valve comprising;
   (a) an elongated body, a bore extending through said body along the long axis thereof and having three contiguous sections,
      (1) an upstream section of said bore having a first diameter,
      (2) a downstream section which has a second diameter larger than said first diameter, and
      (3) a section of increasing diameter between said first and second sections of said bore;
   (b) said section of increasing diameter defining a frustoconical form having an angle of about 20°;
   (c) a ball positioned in said downstream section having a third diameter larger than said first diameter and smaller than said second diameter; and
   (d) a pin extending into said bore in said downstream section at a point downstream of said ball and extending a distance into said bore to prevent said ball from moving past said pin, said ball being positioned between said pin and said upstream section and moveable in said downstream section.

8. The check valve according to claim 7 wherein a ball seat is formed within said frustoconical.

* * * * *